United States Patent Office 2,755,304
Patented July 17, 1956

2,755,304

POLYHYDROXYL POLYAMINO COMPOUNDS

Frederick C. Bersworth, East Orange, N. J., and Albert E. Frost, Millis, Mass., assignors, by direct and mesne assignments, to The Dow Chemical Company, Midland, Mich., a corporation of Delaware No Drawing. Application February 20, 1953,
Serial No. 338,164

8 Claims. (Cl. 260—584)

This invention relates to a new and useful class of polyhydroxyl polyamino compounds which are sequestering agents for heavy metal ions, including iron, in strongly acid to strongly alkaline solution.

It is, therefore, an object of this invention to prepare polyhydroxyl polyamino compounds which are capable of sequestering heavy metal ions, and particularly ferric iron, in strongly acid to strongly alkaline solution.

Another object is to provide intermediate compounds useful for the textile industry and the soap industry in the preparation of cleaning and detergent products.

Other objects and advantages of the invention will in part be obvious and in part appear hereinafter.

The following invention comprises polyhydroxyl polyamino compounds of the general formula:

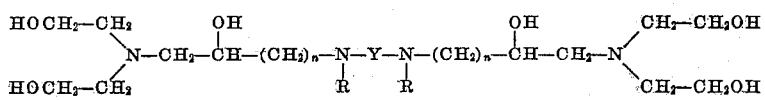

wherein Y is a bivalent alkylene radical of two to three carbon atoms which may be unsubstituted or may bear one or more lower alkyl groups, such as those of one to two carbon atoms; $n$ is a positive integer, 1, 2, 3 or 4; R is a member of the group consisting of hydrogen, methyl, ethyl, n-propyl, isopropyl and butyl radicals.

The compounds of this invention may be prepared by any of several methods. One of these methods consists in reacting two molecular proportions of a suitable halogen substituted C-alkyl substituted triethanolamine, such as, C-(2-chloromethyl)-triethanolamine, with one molecular proportion of an alkylene diamene bearing the desired substituents R and Y under conditions so as to obtain a maximum yield of the desired product.

A second method of preparation consists in reacting an appropriate ω-amino-C-alkyl substituted triethanolamine derivative for example, C-(2-aminomethyl)-triethanolamine, with the proper alkylene dihalide, such as, ethylene dichloride in a two to one molar ratio.

Although these compounds can be prepared by methods other than those described above and also by modifications which will appear to those skilled in the art, we prefer to use the procedure followed in the specific examples since it is easily carried out, requires no complicated apparatus and involves a minimum of manipulative steps.

As suitable ω-halogen substituted —C-alkyl substituted triethanolamines there may be mentioned, for example, C-(2-chloromethyl)-triethanolamine, C-(2-chloroethyl)-triethanolamine, C-(2-chloropropyl)-triethanolamine, C-(2-chlorobutyl)-triethanolamine, C-(2-bromomethyl)-triethanolamine and C-(2-bromopropyl)-triethanolamine.

As alkylene diamines useful in preparing the compounds of this invention, there may be mentioned ethylene diamine, isopropylene diamine, trimethylene diamine, N,N'-dimethyl ethylene diamine, N,N'-diethyl ethylene diamine, N,N'-diisopropyl ethylene diamine, N,N'-di-n-propyl ethylene diamine, N,N'-dimethyl trimethylene diamine, N,N'-dibutyl isopropylene diamine, and N,N'-di-n-propyl isopropylene diamine.

In addition to the alkylene diamines and substituted alkylene diamines mentioned above, 1,2-diaminocyclohexane and its N,N'-dialkyl substituted derivatives may be used.

A preferred compound of this series is produced from 1,2-diaminocyclohexane and C-(2-chloromethyl)-triethanolamine and is represented by the following formula:

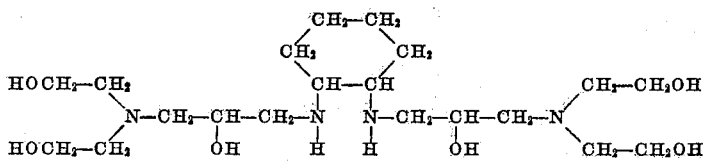

The product is a sequestering agent for iron and other heavy metal ions in strongly alkaline solution.

The compounds of this invention possess useful and interesting properties as sequestering agents for heavy metal ions and, especially for iron, in strongly acid to strongly alkaline solution and even dissolve ferric hydroxide in strongly alkaline solutions at room temperature. They, therefore, have broad application in the textile and leather industries, in cosmetic and soap preparations, in washing compounds, soaker alkali, glass and metal cleaning preparations, in electroplating, as antioxidants, additives to lubricants and in numerous other applications for which sequestering agents may be employed.

The compounds of this invention are generally pale yellow to orange viscid syrups having little or no odor. They are extremely soluble in water and in aqueous solutions of acids and bases, a property which presents considerable difficulty in the purification of these products. For the purpose of this invention, however, it is not necessary to isolate the pure polyhydroxyl polyamino compounds since they are best employed in aqueous solution. Their aqueous solutions are rather strongly basic.

The compounds of this invention possess interesting and useful properties as sequestering agents for heavy metal cations, especially in iron, in strongly acid to strongly alkaline solution.

The insolubility of ferric hydroxide and some basic salts of the ferric ion is well known. Aqueous solutions of ferrous compounds are rapidly oxidized to insoluble ferric compounds in acid solutions and particularly in alkaline solutions. Triethanolamine and certain sugars can sequester iron in alkaline solution. However, they all suffer the disadvantage of being applicable only in alkaline medium; the sugars suffer the further disadvantage of decomposition in alkali, particularly on warming. The polyhydroxyl polyamino compounds of this invention are stable in alkaline and in acid solution, and possess a high solvent action on ferric hydroxide even in strongly alkaline medium.

The ability of our polyhydroxyl polyamino compounds to sequester ferric ion in alkaline solution depends upon their ability to form alcoholate type compounds which may be represented by the following general formula:

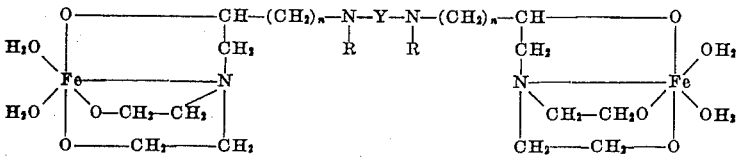

wherein the terms $n$, $Y$ and $R$ have the same significance as above.

In acid solution, the ferric ions are probably solubilized by the formation of compounds involving the nitrogen atoms of the diamine moiety.

This invention will further be illustrated by the following examples. It should be remembered that these examples are given primarily by way of illustration and the invention in its broader aspects is not to be restricted to these examples.

EXAMPLE 1

*N,N'-di-(2-hydroxy-3-iminodiethanolpropyl)-ethylene diamine*

(HOCH$_2$CH$_2$)$_2$NCH$_2$CHOHCH$_2$NHCH$_2$CH$_2$
   NHCH$_2$CHOHCH$_2$N(CH$_2$CH$_2$OH)$_2$

A solution of 0.4 mol (79.1 grams) of C-(2-chloromethyl)-triethanolamine in 250 milliliters of water was added dropwise over a 3-hour period to a well stirred solution of 0.2 mol (12.0 grams) of ethylene diamine in 36 milliliters of water heated to slow reflux. A solution of 0.4 mol (16.0 grams) of sodium hydroxide in 100 milliliters of water was added as needed to keep the pH above 10. The solution was then refluxed for an additional 9 hours at the end of which time it was evaporated to dryness under reduced pressure and the viscous pale yellow residue extracted with absolute alcohol to remove sodium chloride. Evaporation of the alcoholic solution under reduced pressure gave a viscid yellow-orange liquid, soluble in water and alcohols and insoluble in other common organic solvents. This product is N,N'-di-(2-hydroxy-3-iminodiethanolpropyl)-ethylene diamine. Its aqueous solutions chelate iron and other heavy metal ions in strongly acid to strongly alkaline solutions and also dissolve ferric hydroxide in the cold at high pH's.

EXAMPLE 2

*N,N'-di-(2-hydroxy-3-iminodiethanolpropyl)-isopropylene diamine*

(HOCH$_2$CH$_2$)$_2$NCH$_2$CHOHCH$_2$NHCH$_2$
   CH(CH$_3$)NHCH$_2$CHOHCH$_2$N(CH$_2$CH$_2$OH)$_2$

To 0.2 mol (14.8 grams) of isopropylene diamine in 25 milliliters of water heated to slow reflux there was added dropwise over a period of 2 hours, 0.4 mol (79.1 grams) of C-(2-chloromethyl)-triethanolamine in 250 milliliters of water. The pH of the solution was held above 10 by the gradual addition of 0.4 mol (16.0 grams) of sodium hydroxide. The reaction mixture was refluxed for 8 hours and then worked up according to the procedure of Example 1. The viscid yellow liquid, N,N'-di-(2-hydroxy-3-iminodiethanolpropyl)-isopropylene diamine, is soluble in water and alcohols (such as methyl, ethyl, propyl and isopropyl alcohols), and dissolves ferric hydroxide even at high pH's.

EXAMPLE 3

*N,N-di-(5-hydroxy-6-iminodiethanolhexyl)-N,N'-diethyl ethylene diamine*

(HOCH$_2$CH$_2$)$_2$NCH$_2$CHOH(CH$_2$)$_4$N(C$_2$H$_5$)
   CH$_2$CH$_2$N(C$_2$H$_5$)(CH$_2$)$_4$CHOHCH$_2$N(CH$_2$CH$_2$OH)$_2$

Two-tenths (0.2) mol (48.0 grams) of C-(4-chlorobutyl)-triethanolamine in 125 milliliters of water was added over a two hour period to a slowly refluxing solution of 0.1 mol (11.6 grams) of N,N'-diethyl ethylene diamine in 100 milliliters of water. A solution of 0.2 mol (8.0 grams) of sodium hydroxide in 25 milliliters of water was added from time to time to remove the hydrogen chloride liberated during the reaction. After an additional 8 hours refluxing, the mixture was worked up as in Example 1. The product is a viscous yellow liquid soluble in water and alcohols and in aqueous solution. It sequesters heavy metal ions over a wide pH range.

EXAMPLE 4

*N,N'-di-(2-hydroxy-3-iminodiethanol-propyl)-N,N'-dimethylethylene diamine*

(HOCH$_2$CH$_2$)$_2$NCH$_2$CHOHCH$_2$N(CH$_3$)CH$_2$
   CH$_2$N(CH$_3$)CH$_2$CHOHCH$_2$N(CH$_2$CH$_2$OH)$_2$

Four-tenths (0.4) mol (79.1 grams) of C-(3-chloromethyl)-triethanolamine in 250 milliliters of water was added dropwise over a period of 2 hours to 0.2 mol (17.6 grams) of N,N'-dimethyl ethylene diamine in 100 milliliters of water heated to slow reflux. A solution of 0.4 mol (16.0 grams) of sodium hydroxide in 100 milliliters of water was added from time to time to remove the hydrogen chloride liberated. The solution was refluxed for 8 hours after which it was worked up as in Example 1. The viscous yellow liquid, N,N'-di-(2-hydroxy-3-iminodiethanol)-N,N'-dimethyl-ethylene diamine, is soluble in water and alcohols, and sequesters heavy metal ions, including iron, over a wide pH range.

EXAMPLE 5

*N,N'-di-(2-hydroxy-3-iminodiethanolpropyl)-trimethylene diamine*

(HOCH$_2$CH$_2$)$_2$N—CH$_2$CHOHCH$_2$NHCH$_2$CH$_2$
   CH$_2$NHCH$_2$CHOHCH$_2$N(CH$_2$CH$_2$OH)$_2$

Four-tenths (0.4) mol (79.1 grams) of C-(2-chloromethyl)-triethanolamine in 250 milliliters of water was added over a 2-hour period to a gently refluxing solution of 0.2 mol (14.8 grams) of trimethylene diamine in 100 milliliters of water. A solution of 0.4 mol (16.0 grams) of sodium hydroxide in 100 milliliters of water was added from time to time to remove the hydrogen chloride liberated. After 8 hours of refluxing, the mixture was worked up as in Example 1. The viscous yellow product, N,N'-di-(2-hydroxy-3-iminodiethanolpropyl)-trimethylene diamine, is very soluble in water and alcohols, and sequesters heavy metal ions over a wide pH range.

Compounds of the type described herein include two terminal triethanolamine residues in the chain of the molecule. The compound thus becomes capable of forming alcoholate type linkages which are effective to complex iron (ferric) in very strongly alkaline solution, e. g., in solutions of pH about 12 and greater.

Though the invention has been described with reference to only a relatively small number of examples, it is to be understood that variations thereof may be devised without departing from the spirit or scope of the invention.

What we claim is:
1. Chemical compound corresponding to the general formula:

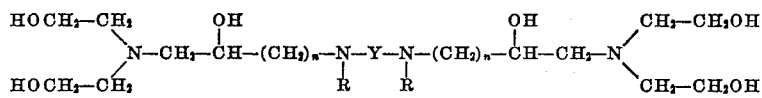

wherein Y is a bivalent alkylene radical which places two to three carbon atoms in the chain of the molecule between the nitrogen atoms; R is a member of the group consisting of hydrogen, methyl, ethyl, n-propyl, isopropyl and butyl radicals, and n is a positive integer from 1 through 4.

2. A compound in accordance with claim 1, in which R is hydrogen.

3. A compound in accordance with claim 1, in which n is 1.

4. The compound N,N'-di-(2-hydroxy-3-iminodiethanol propyl)-ethylene diamine conforming to the formula:

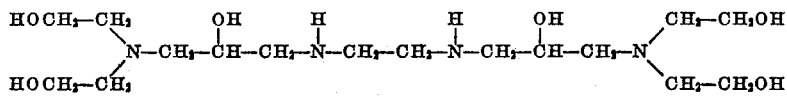

5. The compound N,N' - di - (2-hydroxy-3-iminodiethanol propyl)-isopropylene diamine conforming to the formula:

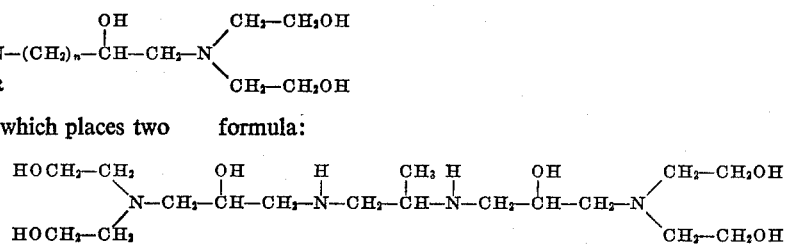

6. The compound N,N' - di - (5-hydroxy-6-iminodiethanolhexyl)-N,N'-diethyl ethylene diamine conforming to the formula:

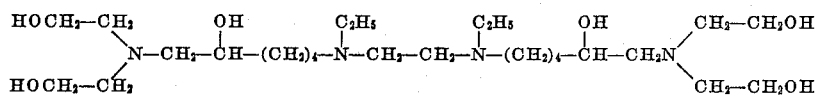

7. The compound N,N' - di - (2-hydroxy-3-iminodiethanol propyl)-N,N'-dimethyl ethylene diamine conforming to the formula:

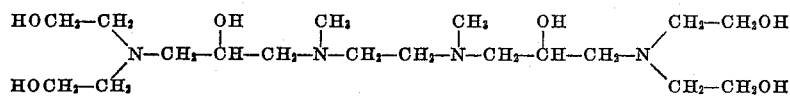

8. The compound N,N' - di - (2-hydroxy-3-iminodiethanol-propyl)trimethylene diamine conforming to the formula:

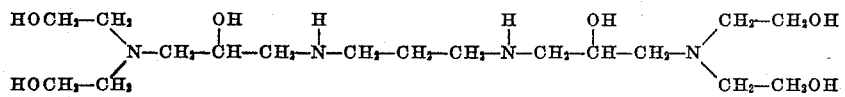

No references cited.